United States Patent [19]

Ferrari et al.

[11] Patent Number: 4,683,116
[45] Date of Patent: Jul. 28, 1987

[54] NUCLEAR REACTOR

[75] Inventors: Harry M. Ferrari, Edgewood Boro; John F. Wilson, Murrysville Boro, both of Pa.

[73] Assignee: Westinghouse Electric Corp., Pittsburgh, Pa.

[21] Appl. No.: 732,220

[22] Filed: May 9, 1985

[51] Int. Cl.$^4$ .................................................. G21C 3/32
[52] U.S. Cl. .................................... 376/447; 376/339; 376/438; 376/446
[58] Field of Search ................. 376/447, 446, 438, 339

[56] References Cited

U.S. PATENT DOCUMENTS

| | | | |
|---|---|---|---|
| 3,510,398 | 5/1970 | Wood | 376/447 |
| 4,474,728 | 10/1984 | Radford | 376/339 |
| 4,566,989 | 1/1986 | Radford | 376/339 |
| 4,576,787 | 3/1986 | Alsop | 376/447 |

Primary Examiner—Donald F. Walsh

[57] ABSTRACT

A nuclear reactor in which control rods are inserted in the thimbles of only certain of the fuel assemblies (which may be called controlled assemblies) in the core and the remainder of the assemblies (which may be called non-controlled assemblies) are provided with hollow structural members containing burnable poison which form these non-controlled assemblies into integrated units. The hollow structural members are formed with end plugs welded to the lower end and are open at the top. The end plug of each member is secured to the bottom nozzle of the non-controlled fuel assembly. A skeleton is formed of the bottom nozzle, the structural members secured to it and a plurality of grids spaced along the structural members. A bulge tool is then inserted in each hollow member and it is on each side of each grid. Neutron absorbers are then inserted in each hollow member and an upper end plug is welded to it. The fuel rods are then inserted in the assembly and the upper end plugs are secured to the top nozzle.

Typically, there are 24 thimbles in a controlled assembly but not all thimble locations in a non-controlled assembly contain neutron-absorber structural members. Typically, there are eight structural members in a non-controlled assembly. In the other positions there are fuel rods. In reactors where there are water displacement control rods which extend over several assemblies, the so-called non-controlled assemblies may have the necessary thimbles for the water displacement rods.

4 Claims, 8 Drawing Figures

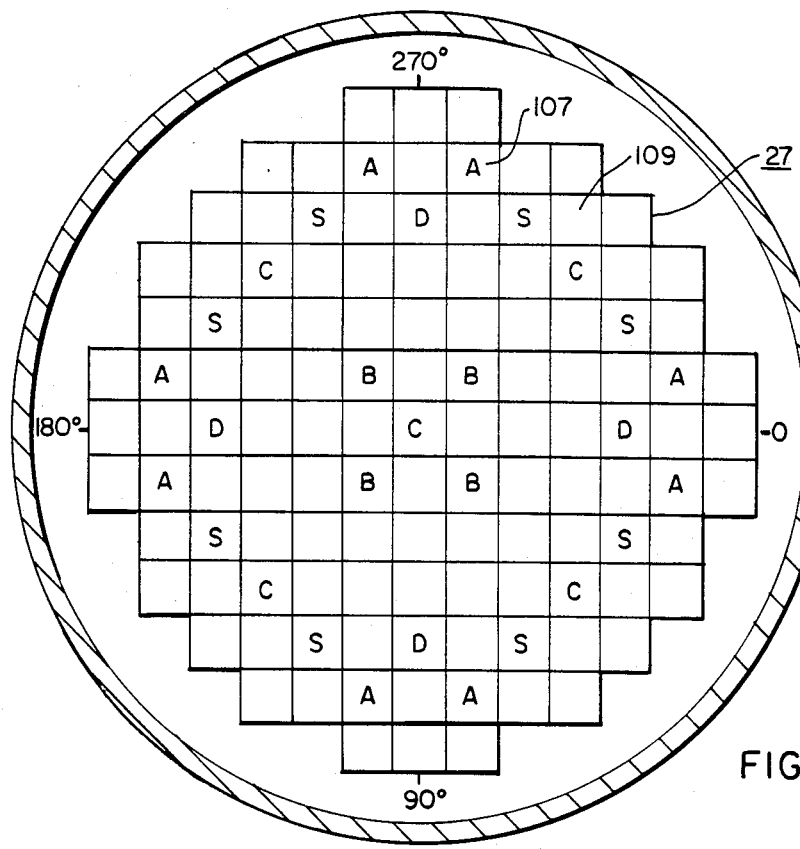
FIG. 2.
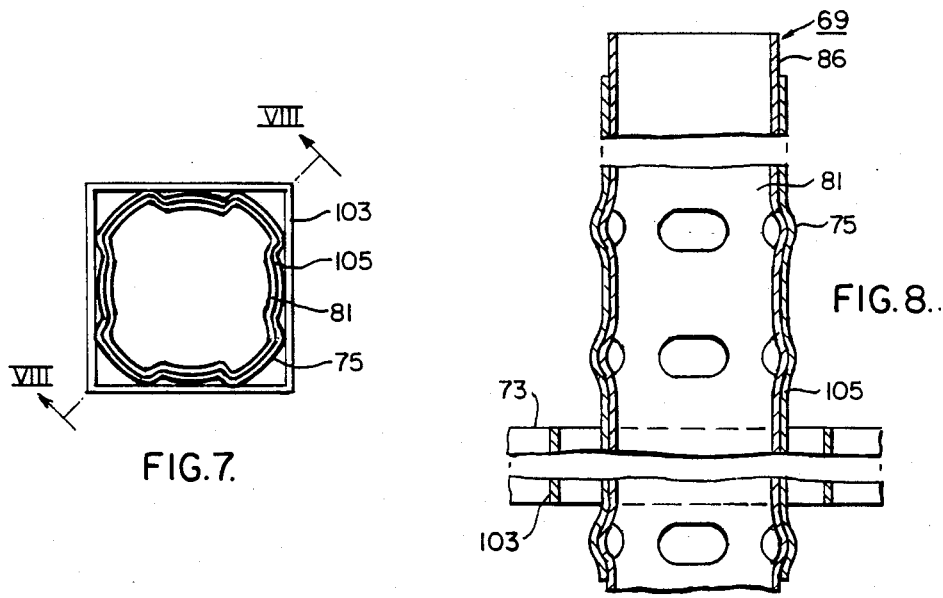
FIG. 7.
FIG. 8.

NUCLEAR REACTOR

BACKGROUND OF THE INVENTION

This invention relates to the nuclear art and it has particular relationship to nuclear reactors for supplying electrical power. In the interest of safety and reliability, the cost of constructing and installing a nuclear power plant has increased to a high level. In view of the high investment demanded, it is desirable that the economics of the power reactor be such as to moderate the rate structure to the extent practicable. It is accordingly an object of this invention to provide a nuclear reactor for electrical power purpose in whose use and operation material reduction in rates as compared to current reactors shall be obtainable.

SUMMARY OF THE INVENTION

In reactors in accordance with the teachings of the prior art, the nuclear core of a reactor includes a plurality of fuel assemblies. Each fuel assembly includes a plurality of elongated fuel rods and in addition a plurality of so-called "thimbles" which are essentially tubes. Control rods are moveable into and out of the thimbles of some, but not all, of the fuel assemblies. The thimbles also serve the purpose of securing each fuel assembly into an integrated unit. For this purpose the thimbles are secured to the top and bottom nozzle of each fuel assembly. In prior art reactors, all fuel assemblies, those which receive or guide control rods and those which do not, are alike. They all have thimbles which serve to secure the assembly into an integrated unit.

The assemblies which receive control rods are herein referred to as controlled assemblies. The assemblies which do not have control rods are referred to herein as non-controlled assemblies. The controlled assemblies are described as having control-rod or thimble locations or positions and the non-controlled assemblies are described as having non-control-rod locations or positions. This invention arises from the realization that substantial advantages can be achieved by structuring the noncontrolled assemblies differently from the controlled assemblies.

The expression control rods as used in this application and in the art in its general sense refers to three kinds of rods: control rods, grey rods and water displacement rods. The rods of the three types are mounted in clusters on a spider. Each control-rod and grey-rod cluster is associated with a separate fuel assembly into whose thimbles the control rods are moveable. The water displacement rods are moveable into thimbles in a plurality of neighboring fuel assemblies. The different rods and their mounting are described in application Ser. No. 715,125 filed Mar. 26, 1985, to Franklin D. Obermeyer and Luciano Veronesi for Nuclear Reactor assigned to Westinghouse Electric Corporation and incorporated herein by reference. This invention concerns itself predominantly with fuel assemblies which receive control rods or grey rods; i.e., with rods each of whose clusters are associated, and penetrate into, a particular fuel assembly. However, fuel assemblies in accordance with this invention may be structured so that they also receive water displacement rods.

The fuel-assembly guide-thimble geometry in controlled assemblies is fixed and constricted by the control rod array of the associated clusters. The thimbles in each such assembly must be precisely positioned so that the control rods do not blind as they are moved inwardly and outwardly of the thimbles. Non-controlled assemblies, particularly those which do not receive any rods, are not so constricted thus affording flexibility as to their construction and design.

In arriving at this invention it has been realized that while there must be similarities between controlled and non-controlled assemblies, there may be marked differences. Advantage may be taken of these differences to provide an improved reactor. The non-controlled fuel assemblies must be compatible with the controlled assemblies in the following respects. Both types of assemblies:

1. Must have the same pressure gradient along the assemblies (vertically from bottom to top) to minimize cross-flow between assemblies.
2. Must have the same cross-sectional envelope dimensions.
3. Must interface with the upper and lower core plates in the same way.
4. Must interface with the refueling machine gripper in the same way.
5. Must have grids as disclosed, for example, in Andrews U.S. Pat. No. Re. 28,079 and the grids must be located substantially in the same positions along the assemblies.
6. Must meet the same seismic requirements and respond to a loss-of-coolant accident (LOCA) in the same way.

The non-controlled assemblies need not be similar to, or compatible with, the controlled assemblies in at least the following respects:

1. The number and spacing of the fuel rods need not be the same.
2. The overall or aggregate length of the fuel rods need not be the same.
3. The guide thimbles are not required in the non-controlled assemblies.
4. The structural members or tie rods in non-control-rod locations, which bind an assembly into an integrated unit, need not include provisions for insertion of control rods so that, for example, their cross-section thickness may be greater than that of thimbles.
5. In non-controlled assemblies, the structural members can be located anywhere in the fuel assembly cross-section and not necessarily in the thimble locations of the controlled assemblies.
6. The number of structural members and the number of fuel rods in non-controlled assemblies need not be the same as the number of thimbles and fuel rods in controlled assemblies.
7. It is not necessary that the top nozzle of a non-controlled assembly accommodate the spider of a control-rod cluster during a scram when rods are fully inserted. Therefore, the vertical length of the top nozzle may be reduced so that longer fuel rods can be accommodated.
8. The top nozzle adapter plate of a non-controlled assembly need not include provisions for attaching hollow guide thimbles.

This invention results from evaluation of the above-stated limitations and freedoms. This evaluation has led to the creation of a nuclear reactor whose controlled and non-controlled fuel assemblies are different. Advantage is taken of the above freedoms to provide non-controlled assemblies which endow the nuclear reactor according to this invention with marked advantages over prior-art reactors in which all assemblies are alike.

In accordance with this invention, there is provided a nuclear reactor whose non-controlled assemblies have structural members which are hollow tubes or cladding at least certain of which contain burnable neutron absorbers or neutron poison. Typically, the neutron absorbers may be pellets of gadolinium compounds or of borosilicate glass, which may contain a high percentage of boron 10 or boron carbide in a matrix of aluminum oxide (see, for example, application Ser. No. 352,731 filed Feb. 26, 1982 to William G. Carlson et al. for Burnable Neutron Absorbers and assigned to Westinghouse Electric Corporation). The structural member is sealed throughout and protects the neutron absorbers from the coolant and the coolant cannot distribute the poison throughout the reactor. A burnable neutron absorber includes neutron absorber material; e.g. boron or gadolinium, in such low concentration that it burns out in a given time during the fuel cycle. For example, a burnable neutron absorber may burn out during the first year of a three-year cycle. After that, it no longer absorbs neutrons substantially. The burnable neutron absorber is thus effective only during the early part of the cycle when the reactivity of the fuel is high. The neutron-absorber material in control rods on the other hand is in such high concentration that the quantity of material which is converted during the life of the reactor does not materially reduce the effectiveness of the control rods.

In the construction of a non-controlled fuel assembly, a skeleton including the bottom nozzle, and the structural members, held together by grids is provided. The structural members have end plugs at the bottom by which they are secured to the bottom nozzle. They are open at the top. The structural members are bulged above and below each grid. Then the neutron absorber pellets and a spring for holding the pellets is inserted in each structural member. After evacuation, heating and back-filling with an inert gas, an end plug is secured to each structural member. The fuel rods are then inserted in the skeleton and the top nozzle is mounted and the structural members secured to it.

The thickness of the structural members in the non-controlled fuel assemblies is greater than the thickness of the thimbles which serve as structural members in the controlled assemblies. Typically, a thimble in a controlled assembly, which is a hollow circular cylinder, has an OD of 0.484 inch and an ID of 0.448 inch or a thickness of 0.018 inch, while a structural member of a non-controlled assembly has an OD of 0.484 inch and an ID of 0.423 inch or a thickness of 0.031 inch. There are substantially fewer structural members in the non-controlled assembly than in the controlled assembly. Typically, there are 24 thimbles, 1 instrumentation tube and 264 fuel rods in a controlled assembly having 17×17 or 289 total locations. In a non-controlled assembly according to this invention having the same number of locations, there are only 8 structural members and one instrumentation tube. Fuel rods are inserted in the other locations so that there are 304 fuel rods. As far as fuel content is concerned, the effect of increasing the number of fuel rods in the non-controlled assembly is to increase the effective fuel length for the overall assembly by 8.7 inches. The fuel cycle cost is reduced by 1.2%. The KW/ft is reduced by approximately 6% and the pellet-clad interaction (PCI) margin is increased, resulting in improved reliability. The reduction in the KW/ft also increases the margin between the operational flow of coolant and the design limit at which there is overheating.

It has been prior-art practice in reactor fuel bundles, which do not include thimbles for control rods, to provide tie rods which are cylinders filled with nuclear fuel. Tie rods of this type have the disadvantage that they grow non-uniformly during operation of the reactor and become disengaged from the nozzles. The structural members, according to this invention, grow more uniformly so that the structural integrity of the non-controlled fuel assemblies remains sound.

BRIEF DESCRIPTION OF THE DRAWINGS

For a better understanding of this invention both as to organization and as to its method of operation, together with additional objects and advantages thereof, reference is made to the following description, taken in connection with the accompanying drawings, in which:

FIG. 2 is a diagram representing the top of the core of the reactor shown in FIG. 1 and showing the distribution of the controlled and non-controlled fuel assemblies;

FIG. 7 is a plan view of a structural member embodied in non-controlled fuel assemblies in accordance with this invention; and FIG. 8 is a fragmental view in section taken in the direction VIII—VIII of FIG. 7.

DETAILED DESCRIPTION OF EMBODIMENTS

Figure 1:
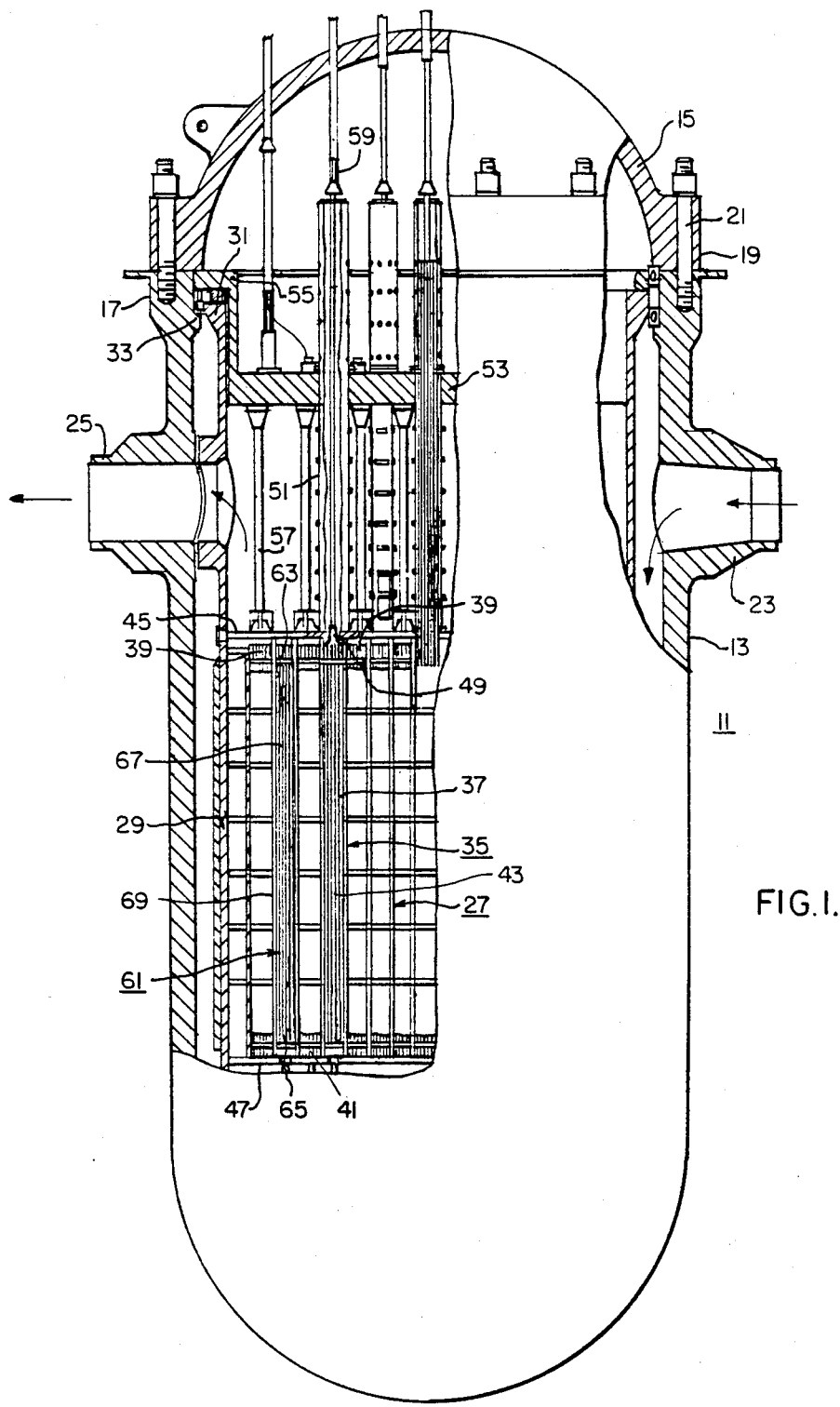
FIG. 1 is a fragmental view of a nuclear reactor in accordance with this invention with walls broken away showing part in longitudinal section.

The apparatus shown in the drawings includes a reactor 11 (FIG. 1) having a pressure vessel including a generally cylindrical body 13 having a semi-spherical base and a dome-shaped head 15. The body 13 and the head 15 have flanges 17 and 19 which are engaged and sealed pressure tight by bolts 21. The body 13 has inlet nozzles 23 and outlet nozzles 25 for the coolant. In the lower part of the body 13 there is a core 27. The core 27 is encircled by a core barrel 29 having a flange 31 by which the core barrel 29 is suspended from a ledge 33 on the flange 17 of the body 13.

The core 27 has a plurality of fuel assemblies 35. These fuel assemblies are conventional. Typically, such assemblies are shown in U.S. Pat. No. 4,522,780 granted June 11, 1985 to Shallenberger et al. for Removal and Replacement of Nuclear Reactor Fuel Assemblies, assigned to Westinghouse Electric Corporation. Each fuel assembly 35 includes a plurality of fuel rods 37 interposed between a top nozzle 39 and a bottom nozzle 41. Each fuel assembly 35 also has a plurality of thimbles 43. The thimbles are secured to the top nozzle 39 and the bottom nozzle 41 and bind the fuel assembly into an integrated unit. The manner in which the thimbles 43 is secured to the top and bottom nozzles is conventional. Typical structure is shown in Shallenberger et al. (supra). Each fuel assembly 35 has grids (not shown, but see Andrews supra) for holding the fuel rods 37 together. The fuel assemblies 35 are mounted between upper and lower core plates 45 and 47 which are supported by core barrel 29. Control rods (not shown) are moveable into and out of the thimbles 41 of each fuel assembly 35. The control rods associated with each assembly 35 are suspended in a cluster from a spider 49. The control rods are moveable in guides 51 above the upper core plate 45. The assembly of guides 51 is referred to as the upper internals of the reactor. The guides are supported in a generally cup-shaped member 53 having a flange 55 by which it is suspended above the barrel flange 31. The member 53 is also supported by columns 57 which extend between the upper core plate 45 and the member. The control rod clusters are each movable upwardly or downwardly by drive rods 59, which are operated by a mechanism (not shown) above the head 15.

Figure 3:
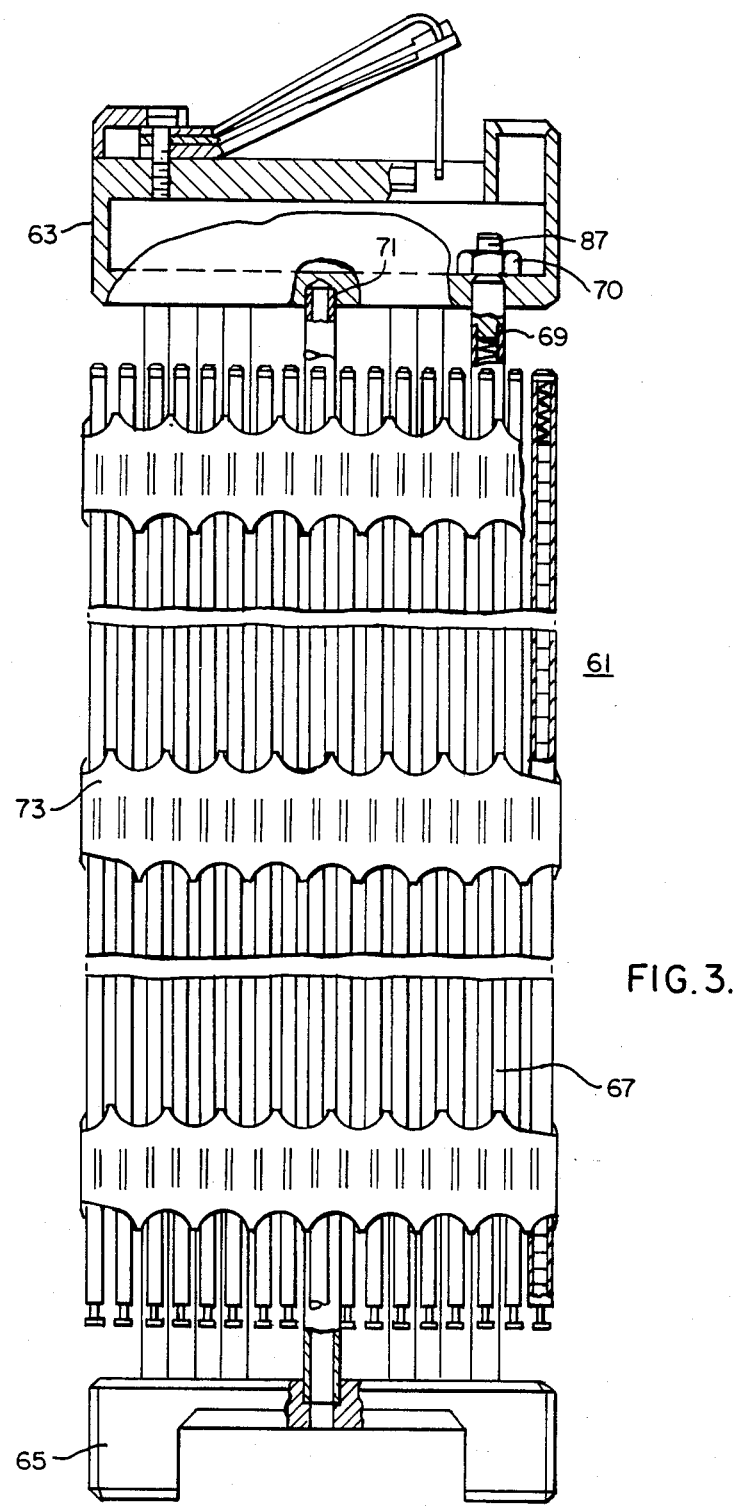
FIG. 3 is a view in side elevation of a non-controlled fuel assembly in accordance with this invention.
Figure 4:
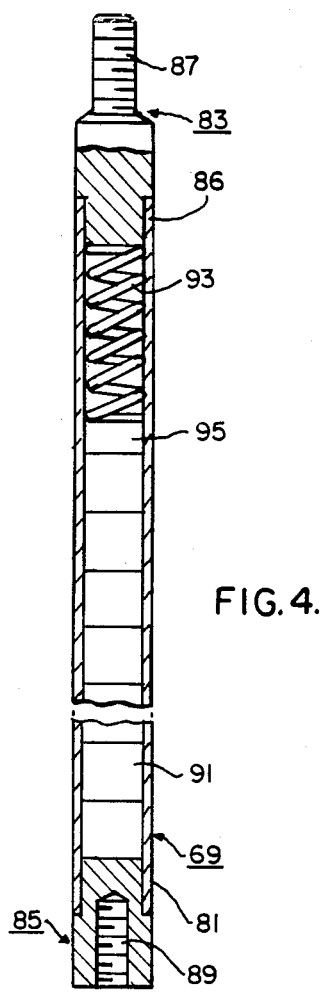
FIG. 4 is a view in section of a structural member or tie rod embodied in non-controlled fuel assemblies in accordance with this invention.
Figure 5:
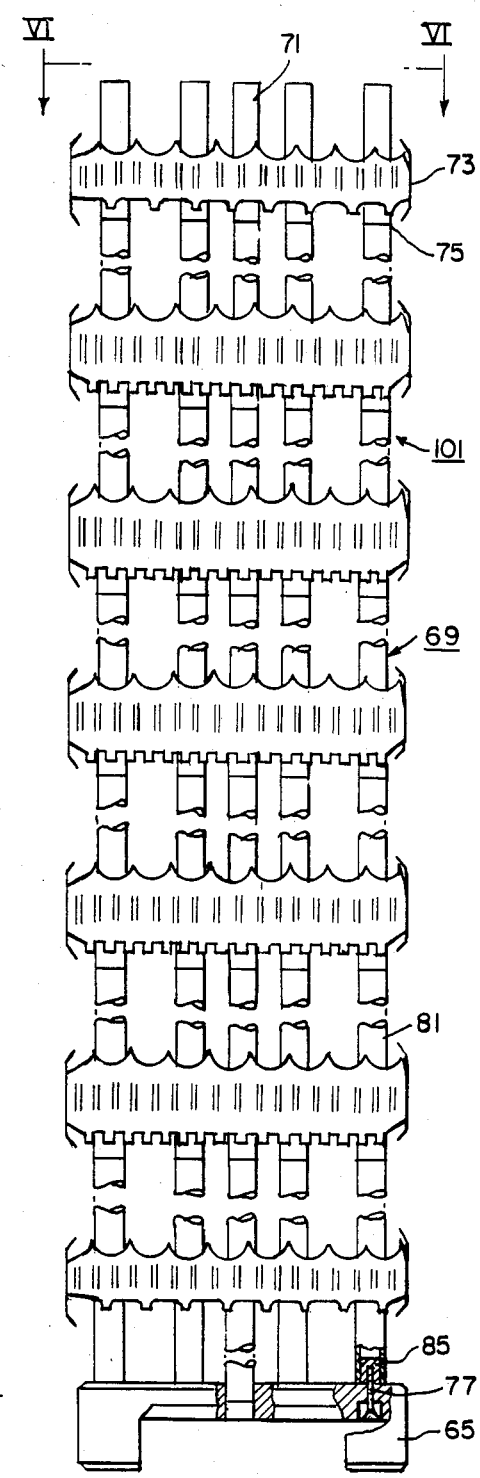
FIG. 5 is a view in side elevation of a skeleton which is produced in the process of construction of a non-controlled fuel assembly in accordance with this invention.

The core 27 also includes fuel assemblies 61 (FIGS. 1, 3) with which control rods are not associated. Each of the assemblies 61 includes a top nozzle 63, a bottom nozzle 65, fuel rods 67 interposed between the nozzles 63 and 65 and structural members or tie rods 69 (FIG. 4) secured to the top and bottom nozzles. Typically, each structural member may be threaded onto a screw 77 (FIG. 5) extending from the lower nozzle 65 and secured by a nut 70 to the top nozzle as shown in FIG. 3. The tie rods 69 bind the assembly 61 into an integrated unit. There is also a central tube 71 for instrument secured to the top and bottom nozzles. Such a central tube (not shown) is also included in each of the conventional fuel assemblies 35. The fuel rods 67 and structural members 69 are held together by grids 73 as disclosed in Andrews (supra). The grids 73 are prevented from being displaced longitudinally of the assembly 61 by the force of the sed in Andrews (supra). The grids 73 are prevented from being displaced longitudinally of the assembly 61 by the force of the sed in Andrews (supra). The grids 73 are prevented from being displaced longitudinally of the assembly 61 by the force of the coolant by bulges 75 (FIG. 8) in the structural members on both sides of each grid 73. The coolant flows at a high velocity, typically 50 ft./sec., and is under high pressure, typically 2000 lb./sq. inch.

Typically, the structural members 69 have a substantially greater thickness than the thimbles 43 of the conventional fuel assemblies 35 and there are substbers 69 have a substantially greater thickness than the thimbles 43 of the conventional fuel assemblies 35 and there are substantially fewer structural members 69 in each assembly 61 than thimbles in each assembly 35. The remaining locations in each assembly 61 which correspond to those occupied by thimbles in each conventional fuel assembly 35 are occupied by fuel rods in the fixed assembly 61. For example, there are typically 24 thimbles in an assembly 35; in an assembly 61 there are only 8 structural members and 16 additional fuel rods in the remaining locations.

The lower nozzle 65 is generally similar to the lower nozzle of the conventional fuel assemblies 35 except that it has fewer mechanisms, specifically screws 77 (FIG. 5) for securing the structural members at their lower ends. Thimbles 43 may be secured as shown in Shallenberger (supra). The top nozzle 63 is of smaller vertical height (or length) than the top nozzle 39 of a conventional fuel assembly 35 because it need not include a groove for receiving the spider 49 (FIG. 1) of the control rod cluster during scram.

The structural member 69 (FIG. 4) includes a tube or shell or cladding 81 sealed by end plugs 83 and 85 at the top and bottom. The shell 81 has an extension 86 (FIG. 8) at the top to receive the end plug 83. The end plug 83 at the top has a threaded tip 87 to be engaged by the nut 70 (FIG. 3). The end plug 85 at the bottom has a tapped central hole 89 into which the screw 77 (FIG. 5) from the lower nozzle 65 is threaded. Burnable neutron-absorber pellets 91 are stacked in the tubes 81 of at least certain of the structural members. The others may be empty. Above the stack of pellets 91 there is a space in which there is a spring 93. The spring 93 is compressed between the plug 83 and a cylindrical member 95 which engages the upper pellet 91 of the stack thus maintaining the pellet stack rigid. The burnable neutron absorber burns out to a small residual absorption capability during the early part of a fuel cycle.

Figure 6:
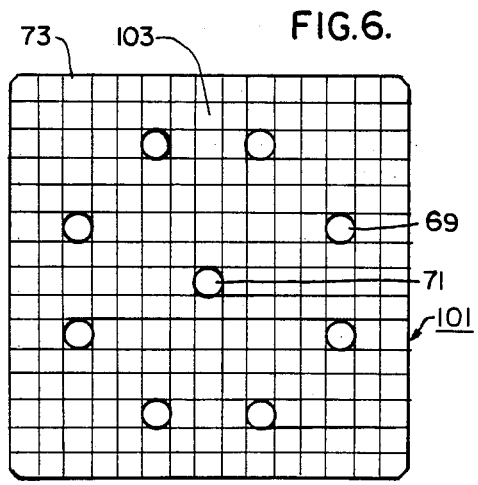
FIG. 6 is a plan view, partly diagrammatic, of the skeleton shown in FIG. 5 taken in the direction VI—VI of FIG. 5.

In fabricating the fuel assembly 61, a skeleton 101 (FIGS. 5, 6) is first formed. The skeleton includes the tubes 81 of the structural members 69. Each tube is empty and is closed by the plug 85 at the bottom and is open at the top. The open tubes 81 are secured to the bottom nozzle 65. The skeleton also includes the instrument tube 71 which is also secured to bottom nozzle 65. The grids 73 are mounted spaced along the tubes 81. Each tube 81 passes through an array of coaxial cells 103 of the grids 73. Each cell 103 is of rectangular transverse cross-section but is lined by an annular sleeve 105 (FIGS. 7, 8) which extends a short distance above and below its associated cell. Each tube 81 engages the coaxial sleeves 105 along which it extends and is a sliding fit in these sleeves. Each tube 81 and the sleeve 105 through which it passes are bulged out to produce bulges 75 above and below each grid 73 by a bulge tool.

Once the skeleton 101 is assembled, the burnable neutron-absorber pellets 91 are inserted in each tube 81. The spring 93 and the block 95 for transmitting the pressure of the spring to the stack is then inserted. The tubes 81 are then evacuated and back-filled with an inert gas, and plug 83 is welded to the top of each tube. The fuel rods 67 are then inserted in coaxial cells 103 in the skeleton 101 and the top nozzle 63 is secured to the structural members 69. The assembly 61 is now complete and may be inserted in the appropriate locations in the core 17. FIG. 2 shows the distribution of assemblies 35 and 61 in the core 17. The assemblies 35 are disposed in the cells 107 which are lettered. The assemblies 109 are disposed in the cells which are not lettered.

While preferred embodiments of this invention have been disclosed herein, many modifications thereof are feasible. This invention is not to be restricted except insofar as is necessitated by the spirit of the prior art.

We claim:

1. A non-controlled nuclear fuel assembly which is not penetrated by control rods during operation of a nuclear reactor in whose core said non-controlled nuclear fuel assembly is contained; the said nuclear fuel assembly including a top nozzle, a bottom nozzle, a plurality of nuclear fuel rods extending between said nozzles, a plurality of grids extending along said fuel rods for maintaining said fuel rods positioned between said nozzles, and structural members, each of which is a hollow tube, secured to said top and bottom nozzles for forming said assembly into an integral unit, the said assembly being characterized by structural members of substantial thickness and at least certain of which contain burnable neutron absorbers.

2. A nuclear reactor including a core having a plurality of fuel assemblies, each of said fuel assemblies having a top nozzle, a bottom nozzle, nuclear fuel rods interposed between said nozzles, grids spaced along said nozzles in engagement with said fuel rods to position said fuel rods, some of said fuel assemblies having thimbles, the thimbles of said some fuel assemblies being secured to said top nozzle and to said bottom nozzle for forming an integrated unit of each of said some assemblies, control rods associated only with said some assemblies, moveable in and out of said thimbles for controlling the operation of said reactor, at least certain of other than said some fuel assemblies having no thimbles at least at some of the locations where said some of said assemblies have thimbles, said other assemblies having tubular members at some of said no-thimble locations secured to said top nozzle and to said bottom nozzle for forming said each of said other fuel assembly into an integrated unit, at least some of said tubular members containing burnable neutron absorbers.

3. The reactor of claim 2 wherein the tubular members have a substantially greater wall thickness than the thimbles.

4. The reactor of claim 5 wherein each of the other than the some assemblies has fewer tubular members than the some assemblies have thimbles and wherein there are locations in said other assemblies, corresponding to the location occupied by thimbles in said some assembies in which there are no thimbles and no tubular members, and wherein there are fuel rods in the no-thimble no-tubular-member locations in said each of said other assemblies whereby there are a greater number of fuel rods in said other fuel assemblies than in said some fuel assemblies.

* * * * *